Feb. 28, 1956  B. MEDENUS  2,736,299
AIR COOLED TWO STROKE CYCLE INTERNAL-COMBUSTION ENGINE
Filed Aug. 2, 1952  4 Sheets-Sheet 3
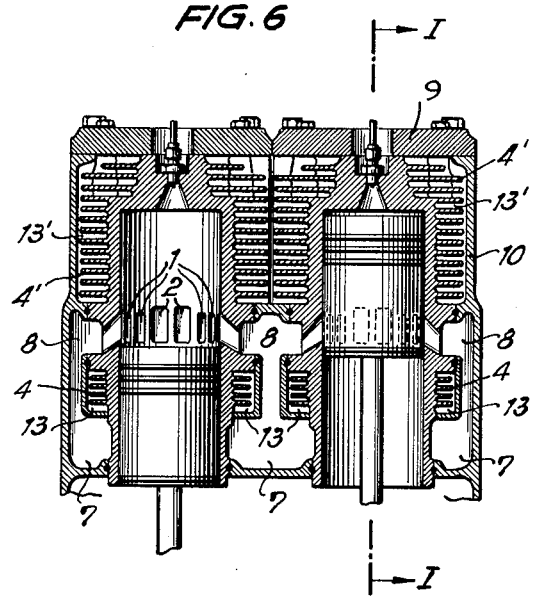
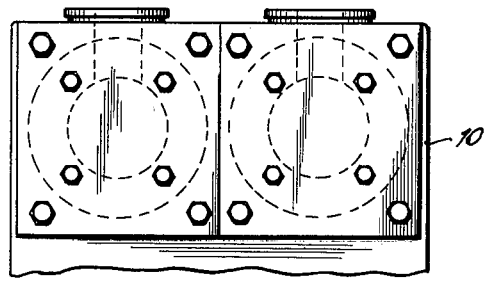
INVENTOR
Bernhard Medenus
By
Patent Agent.

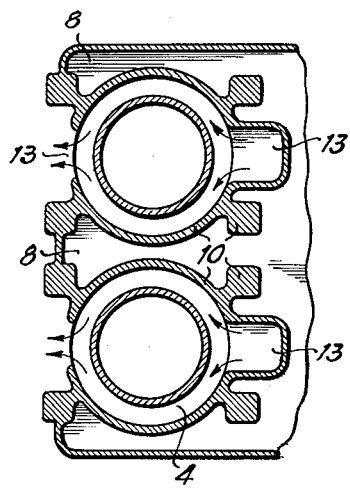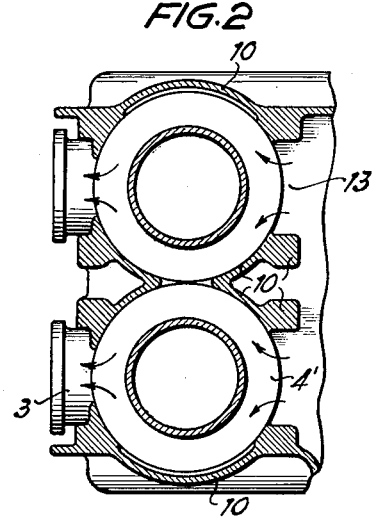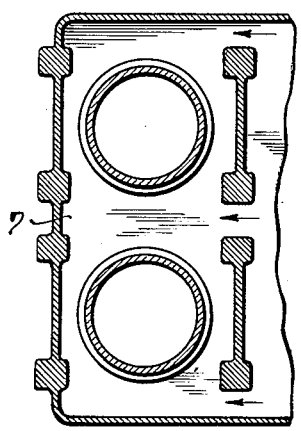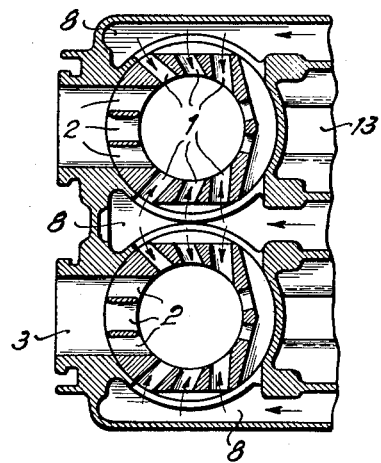

United States Patent Office 2,736,299
Patented Feb. 28, 1956

2,736,299
AIR COOLED TWO STROKE CYCLE INTERNAL-COMBUSTION ENGINE

Bernhard Medenus, Koln-Kalk, Germany, assignor to Klöckner - Humboldt - Deutz Aktiengesellschaft, Koln, Germany Application August 2, 1952, Serial No. 302,368
Claims priority, application Germany August 11, 1951

5 Claims. (Cl. 123—41.6)

The present invention relates to air-cooled internal combusion engines and, more particularly, to air-cooled two-stroke cycle internal combustion engines, in which a plurality of cylinders are arranged in line and in which the axes of the discharge outlets are arranged transverse to the longitudinal direction of said line of cylinders.

It has been found that for an efficient removal of heat from the working piston of a two-stroke cycle internal combustion engine it is advantageous well to cool the cylinder within the range of the lower dead-center position of the piston. With internal combustion engines having one cylinder only, no particular difficulties will be encountered concerning an efficient cooling of the cylinder within the range of the lower dead-center position of the piston. However, when internal combustion engines are involved with a plurality of cylinders, the situation is fundamentally different since, on one hand, a short distance between the cylinders is desired, while, on the other hand, sufficient space is required which will allow the provision of cooling fins and will also make it possible unimpededly to pass the scavenging air upwardly to the scavenging passages in the cylinders.

It is, therefore, an object of this invention to provide an air-cooled two-stroke cycle internal combustion engine having a plurality of cylinders arranged in line, in which the scavenging air, prior to scavenging the cylinders, cools the cylinders within the range of the lower dead-center of the corresponding pistons.

It is a further object to provide an internal combustion engine of the type set forth in the preceding paragraphs, which will allow an unimpeded passage of the scavenging air upwardly from the lower end of the cylinders to the scavenging passages therein.

Another object of this invention consists in the provision of an air-cooled internal combustion engine of the character set forth above with suspended cylinder heads, in which the passages for passing scavenging air upwardly from the lower ends of the cylinders to the scavenging passages therein are at least in part formed by wall sections simultaneously contributing to cooling said cylinder heads.

It is still another object of this invention to provide an air-cooled two-stroke cycle internal combustion engine with two lines of cylinders arranged in V-form with regard to each other, which not only will be more efficiently air-cooled than heretofore possible but will also allow a simplified and improved arrangement of the blowers for delivering cooling air and scavenging air, respectively.

It is also an object of this invention to provide an improved method of cooling the lower ends of cylinders arranged in line and forming part of an air-cooled two-stroke cycle internal combustion engine.

These and other objects and advantages of the invention will appear more clearly from the following specification in connection with the accompanying drawings, in which:

Figure 2 is a section taken along the line II—II of Fig. 1;

Figure 3 is a section taken along the line III—III of Fig. 1;

Figure 4 is a section along the line IV—IV of Fig. 1, while the pistons have been omitted;

Figure 5 is a section taken along the line V—V of Fig. 1 with the pistons omitted;

Fig. 6 is a section taken along the line VI—VI of Fig. 1;

Fig. 7 is a top view of Fig. 6;

*General arrangement*

Figure 1:
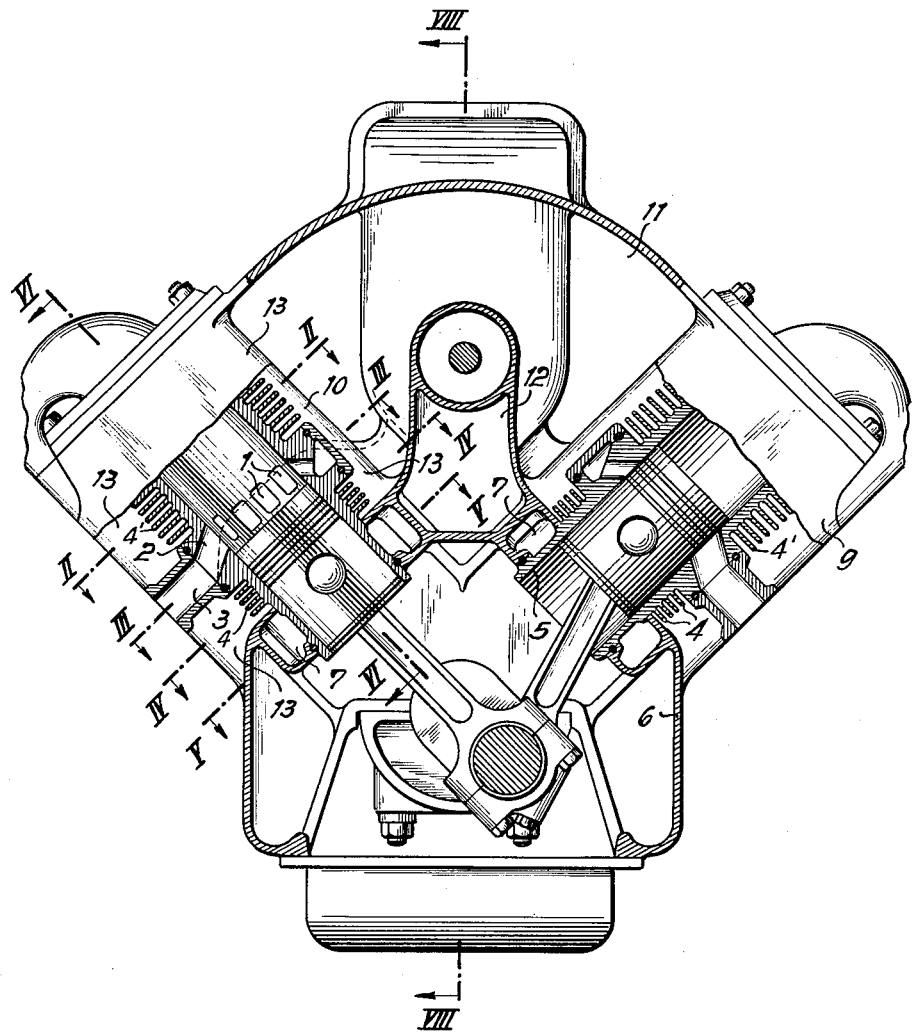
Figure 1 illustrates a cross-section through an air-cooled two-stroke cycle internal combustion engine having two lines of cylinders arranged in V-form relative to each other, said section being taken along the line I—I of Fig. 6.
Figure 8:
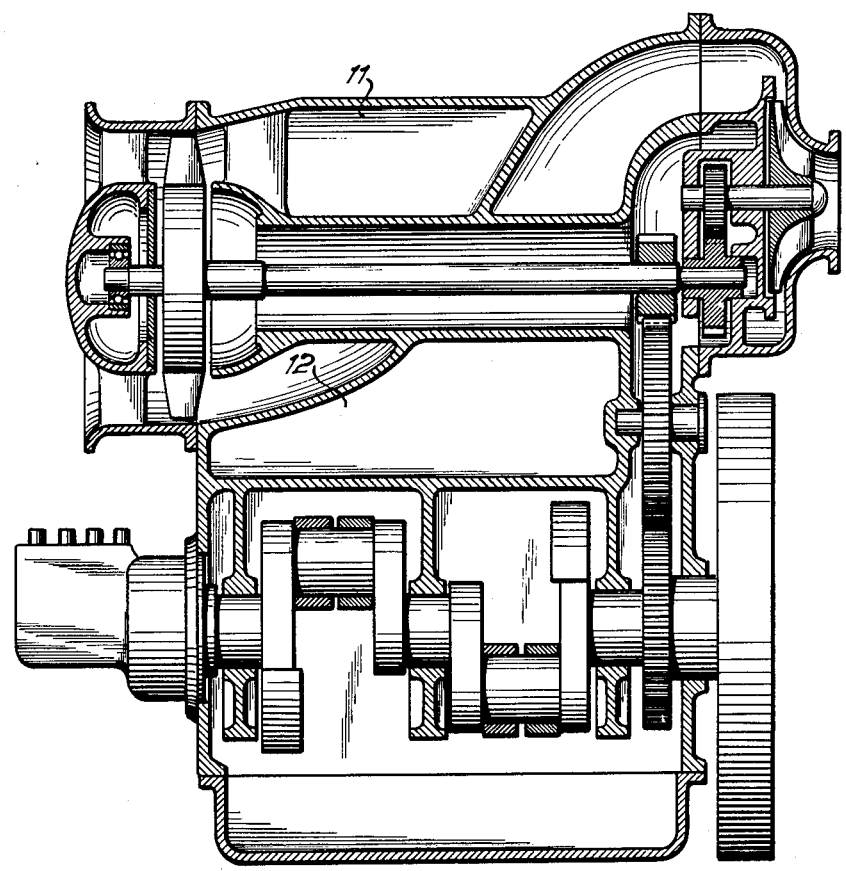
Fig. 8 is a longitudinal section through the blower system of the present invention which furnishes scavenging and cooling air.

The primary feature of the present invention consists in that the cylinders are provided with cooling fins below the inlet and outlet passages and that the lowermost end portions of the cylinders are inserted into the crank case of the engine while the said inserted portions are surrounded by a scavenging air-receiving chamber. This scavenging air-receiving chamber communicates with the scavenging air inlet passages of the cylinders by means of passages or channels extending upwardly from said scavenging air-receiving chambers in spaced relationship to said cooling fins of said inlet passages.

*Structural arrangement*

Referring now to the drawing in detail, the two-stroke cycle internal combustion engine illustrated therein is provided with a unilateral reverse scavenging air inlet arrangement. The scavenging passages are designated by the reference numeral 1, while the outlet passages in the cylinders are designated with the reference numeral 2. The cylinders are arranged with regard to each other in such a manner that the discharge flanges 3 adjacent said discharge passages 2 extend transverse to the longitudinal axis of each line of cylinders. Below the inlet and outlet passages 1 and 3, the cylinders are provided with cooling fins 4 and have their adjacent lower end 5 inserted in the crank case 6. The lower ends 5 of the cylinders in the crank case 6 are surrounded by a scavenging air-receiving chamber along the respective line of cylinders. Each of the scavenging air-receiving chambers 7 communicates with the respective inlet passages 1 of the cylinders pertaining thereto by passage means 8 extending upwardly and in spaced relationship to the cooling fins 4. As will be particularly clear from Figs. 4 and 6, a portion of the wall 10 forming the passage means 8 extends around the fins 4 and forms with the adjacent cylinder portion a passage 13 through which cooling air is guided around and between fins 4.

The two-stroke cycle internal combustion engine shown in the drawings is such that the cylinders are suspended on the cylinder heads 9 and are freely adjustably held in said crank case 6. With such internal combustion engines, it is particularly advantageous, when the passages 8 for conveying the scavenging air from the scavenging air-receiving chamber 7 to the inlet passages 1 are formed by walls 10 which extend upwardly to the cylinder heads, support the latter and, while forming with the upper fins 4' a passage 13' (Fig. 6), act as guiding means for the cooling air around fins 4'. Thus, the walls 10 are so designed that they act as guiding means for the cooling air which, for instance, may be blown by a blower into a chamber or space 11 between the two lines of cylinders from where the cooling air is guided by the said walls 10 through passages 13 and 13' so as to pass around the cylinders and their fins 4, 4' toward the outside.

It is of particular advantage, when, with a two-stroke cycle internal combustion engine having two rows of cylinders arranged in V-shape with regard to each other, the two scavenging air-receiving chambers 7 extending in the crank case 6 along the rows of cylinders communicate with a scavenging air-receiving chamber 12 provided between said rows of cylinders, while scavenging air is blown directly into the said chamber 12. Such an arrangement yields a very favorable design for the internal combustion engine also, with regard to the two blowers necessary for delivering cooling air and scavenging air, respectively. The said two blowers may be arranged at both ends of the engine and may be driven by a drive common to both. It is, of course, understood that the invention is by no means limited to V-engines but can also be applied with all inherent advantages to a motor with only one row of cylinders (as shown in Fig. 6).

It is also to be understood that the present invention is by no means limited to the particular construction shown in the drawings but also comprises any modifications within the scope of the appended claims.

What I claim is:

1. In an air cooled two-line V-engine of the two-stroke cycle internal combustion type, in which the cylinders are provided with scavenging air inlet and outlet passages for admitting scavenging air into and discharging the same from said cylinders, said cylinders having their lower ends inserted in a crankcase, the combination of: a pair of scavenging air receiving chambers respectively associated with each line of cylinders of said engine and surrounding said lower cylinder ends, said cylinders having connected thereto cooling fins below said passages, wall means connected to said cylinders and respectively confining with outer surface portions thereof cooling air passages extending around said second cooling fins for guiding cooling air around the same, said wall means also forming part of passage means having the interior thereof separated from said cooling air passages and respectively effecting communicating between said scavenging air receiving chambers and the scavenging air inlet passages of the respective lines of cylinders pertaining thereto, chamber means arranged between said lines of cylinders and communicating with said scavenging air receiving chambers, and blower means arranged to blow scavenging air directly into said chamber means.

2. An air cooled two-stroke cycle internal combustion engine having a plurality of cylinders arranged in line and provided with scavenging air inlet and outlet passages for admitting scavenging air into and discharging the same from said cylinders, which comprises in combination: a crankcase, the lower ends of said cylinders being inserted in said crankcase, chamber means surrounding said lower cylinder ends and being arranged to receive scavenging air, first cooling fins connected to said cylinders and extending around the same above said inlet and outlet passages, second cooling fins connected to said cylinders and extending around the same below said inlet and outlet passages, wall means connected to said cylinders and respectively confining with outer surface portions thereof cooling air passages extending around said second cooling fins for guiding cooling air around the same, said wall means also forming part of conduit means having the interior thereof separated from the interior of said cooling air passages and communicating with said chamber means, said conduit means extending upwardly in spaced relationship to the periphery of said second cooling fins and communicating with said inlet passages, and cooling air supply means arranged to convey cooling air to said cooling air passages.

3. In an air cooled two-stroke cycle internal combustion engine having a plurality of cylinders arranged in line and provided with scavenging air inlet and outlet passages for admitting scavenging air into and discharging the same from said cylinders, a plurality of cylinder heads, and a crank case, said cylinders respectively being suspended on said cylinder heads and having their lower ends extending into said crank case, the combination of: plate means connected to said cylinder heads, chamber means arranged within said crankcase and surrounding said lower cylinder ends, a wall portion of said chamber means being formed by said lower cylinder ends, said chamber means being arranged to receive scavenging air, first cooling fins extending around and connected to said cylinders and being arranged above said inlet and outlet passages, second cooling fins extending around and connected to said cylinders and being arranged below said inlet and outlet passages, wall means connected to said cylinders and respectively confining with outer surface portions thereof cooling air passages extending around said second cooling fins for guiding cooling air around the same, said wall means also forming part of conduit means having the interior separated from the interior of said cooling air passages and extending upwardly from said chamber means to said inlet passages for effecting communication therebetween and conveying scavenging air from said chamber means to and through said inlet passages, said wall means having an extension engaging and supporting said plate means, and at least a portion of said extension forming guiding means for guiding cooling air around upper portions of said cylinders and between said first cooling fins.

4. In an air cooled two-stroke cycle internal combustion engine having a plurality of cylinders arranged in a plurality of lines and provided with scavenging air inlet and outlet passages for admitting scavenging air into and discharging the same from said cylinders, a plurality of cylinder heads respectively mounted on said cylinders, and a crank case, said cylinders having their lower ends extending into said crank case, the combination of: plate means connected to said cylinder heads, first chamber means arranged within said crankcase and surrounding said lower cylinder ends, a wall portion of said first chamber means being formed by said lower cylinder ends, said chamber means being arranged to receive scavenging air, first cooling fins extending around and connected to said cylinders and being arranged above said inlet and outlet passages, second cooling fins extending around and connected to said cylinders and being arranged below said inlet and outlet passages, wall means connected to said cylinders and respectively confining with outer surface portions thereof cooling air passages extending around said second cooling fins for guiding cooling air around the same, said wall means also forming part of conduit means having the interior thereof separated from the interior of said cooling air passages and effecting communication between said chamber means and said inlet passages, said wall means having an extension engaging and supporting said plate means, said extension being spaced from but substantially parallel to adjacent wall portions of said cylinders to guide cooling air between and around said first cooling fins, second chamber means arranged to receive scavenging air and located between said lines of cylinders and communicating with said first chamber means, and cooling air blower means arranged to deliver cooling air between said wall means and said second cooling fins.

5. An air cooled two-stroke cycle internal combustion engine according to claim 4, which includes scavenging air blower means arranged at one end of said engine and communicating with said second chamber means for delivering scavenging air directly into said second chamber means, said cooling air blower means being arranged at the other end of said engine, and drive means common to both said cooling air blower means and said scavenging air blower means for driving the same.

References Cited in the file of this patent

UNITED STATES PATENTS

| 2,023,403 | Butler | Dec. 10, 1935 |
| 2,209,996 | Neuland | Aug. 6, 1940 |

FOREIGN PATENTS

| 994,738 | France | Aug. 8, 1951 |
| 1,006,398 | France | Jan. 23, 1952 |